(12) United States Patent
Lee

(10) Patent No.: US 12,140,681 B2
(45) Date of Patent: Nov. 12, 2024

(54) NAVIGATION SYSTEM WITH LOCATION CORRECTION MECHANISM AND METHOD OF OPERATION THEREOF

(71) Applicant: TeleNav, Inc., Santa Clara, CA (US)

(72) Inventor: Shane-Woei Lee, Milpitas, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 18/462,091

(22) Filed: Sep. 6, 2023

(65) Prior Publication Data

US 2023/0408707 A1 Dec. 21, 2023

Related U.S. Application Data

(63) Continuation of application No. 17/674,176, filed on Feb. 17, 2022, now Pat. No. 11,860,286.

(51) Int. Cl.
| | | |
|---|---|---|
| G01S 19/04 | (2010.01) | |
| G01S 19/40 | (2010.01) | |
| H04W 64/00 | (2009.01) | |

(52) U.S. Cl.
CPC .......... *G01S 19/40* (2013.01); *H04W 64/003* (2013.01)

(58) Field of Classification Search
CPC ........................................ G01S 19/40
USPC .................................... 342/357.23
See application file for complete search history.

(56) References Cited

U.S. PATENT DOCUMENTS

| | | |
|---|---|---|
| 7,266,445 B1 | 9/2007 | Janky et al. |
| 10,761,216 B2 | 9/2020 | Chen et al. |
| 10,795,025 B2 | 10/2020 | Wang et al. |
| 2018/0192233 A1 | 7/2018 | Del Regno et al. |
| 2018/0210089 A1 | 7/2018 | Wang et al. |
| 2018/0239030 A1 | 8/2018 | Chen et al. |
| 2019/0110270 A1 | 4/2019 | Chen |
| 2021/0006329 A1 | 1/2021 | Tidd et al. |
| 2022/0018968 A1 | 1/2022 | Tsumura |

FOREIGN PATENT DOCUMENTS

| | | | | |
|---|---|---|---|---|
| CN | 103852773 A | 6/2014 | | |
| CN | 107872516 A | 4/2018 | | |
| CN | 117892174 A * | 4/2024 | | |
| WO | WO-2017004033 A1 * | 1/2017 | .......... | G01S 19/071 |
| WO | WO-2022203761 A2 * | 9/2022 | .......... | G01S 13/426 |

* cited by examiner

*Primary Examiner* — Harry K Liu
(74) *Attorney, Agent, or Firm* — Perspectives Law Group, Corp.

(57) ABSTRACT

A navigation system includes: a communication circuit configured to: receive a base station data including an actual location and a satellite provided reference location from a base station, and transfer the base station data to an artificial intelligence (AI) correction calculator, already trained to negate a multipath interference of a position satellite; a control circuit, coupled to the communication circuit, configured to: calculate a real-time kinematics (RTK) correction, by the AI correction calculator, based on the satellite provided reference location and the actual location; and enable the communication circuit to transmit the RTK correction by an over the air (OTA) communication to the base station including the base station transferring the RTK correction to a device for correcting the satellite provided reference location to a real-world location and displaying on the device.

20 Claims, 6 Drawing Sheets

NAVIGATION SYSTEM WITH LOCATION CORRECTION MECHANISM AND METHOD OF OPERATION THEREOF

CROSS-REFERENCE TO RELATED APPLICATION(S)

This application is a Continuation of co-pending U.S. patent application Ser. No. 17/674,176 filed Feb. 17, 2022, and the subject matter thereof is incorporated herein by reference thereto.

TECHNICAL FIELD

An embodiment of the present invention relates generally to a navigation system, and more particularly to a system with a location correction mechanism.

BACKGROUND ART

As the drivers have increasingly relied on global positioning systems (GPS) and similar location technologies to arrive at their destination, the accuracy of the system was sufficient for generating guidance instructions for the driver. With the advent of autonomous vehicles, sensors have been added to the vehicles to maintain lane positions, detect vehicles encroaching the vehicles space, perform automatic braking when approaching a lead vehicle at too close a distance, and perform blind spot checks when changing lanes. The addition of the sensors, at significant cost, has made the vehicles safe for autonomous driving, with the inaccuracies of the GPS system.

Thus, a need still remains for a navigation system with a location correction mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: receiving a base station data including an actual location and a satellite provided reference location; transferring the base station data through a storage interface to an artificial intelligence (AI) correction calculator, already trained to negate a multipath interference of a position satellite; calculating a real-time kinematics (RTK) correction, by the AI correction calculator, based on the satellite provided reference location and the actual location; and enabling the communication circuit to transmit the RTK correction by an over the air (OTA) communication to the base station including the base station transferring the RTK correction to a device for correcting the satellite provided reference location to a real-world location and displaying on the device.

An embodiment of the present invention provides a navigation system, including a communication circuit configured to: receive a base station data including an actual location and a satellite provided reference location, and transfer the base station data to an artificial intelligence (AI) correction calculator, already trained to negate a multipath interference of a position satellite; a control circuit, coupled to the communication circuit, configured to: calculate a real-time kinematics (RTK) correction, by the AI correction calculator based on the satellite provided reference location (204) and the actual location; and enable the communication circuit to transmit the RTK correction by an over the air (OTA) communication to the base station including the base station transferring the RTK correction to a device for correcting the satellite provided reference location to a real-world location and displaying on the device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
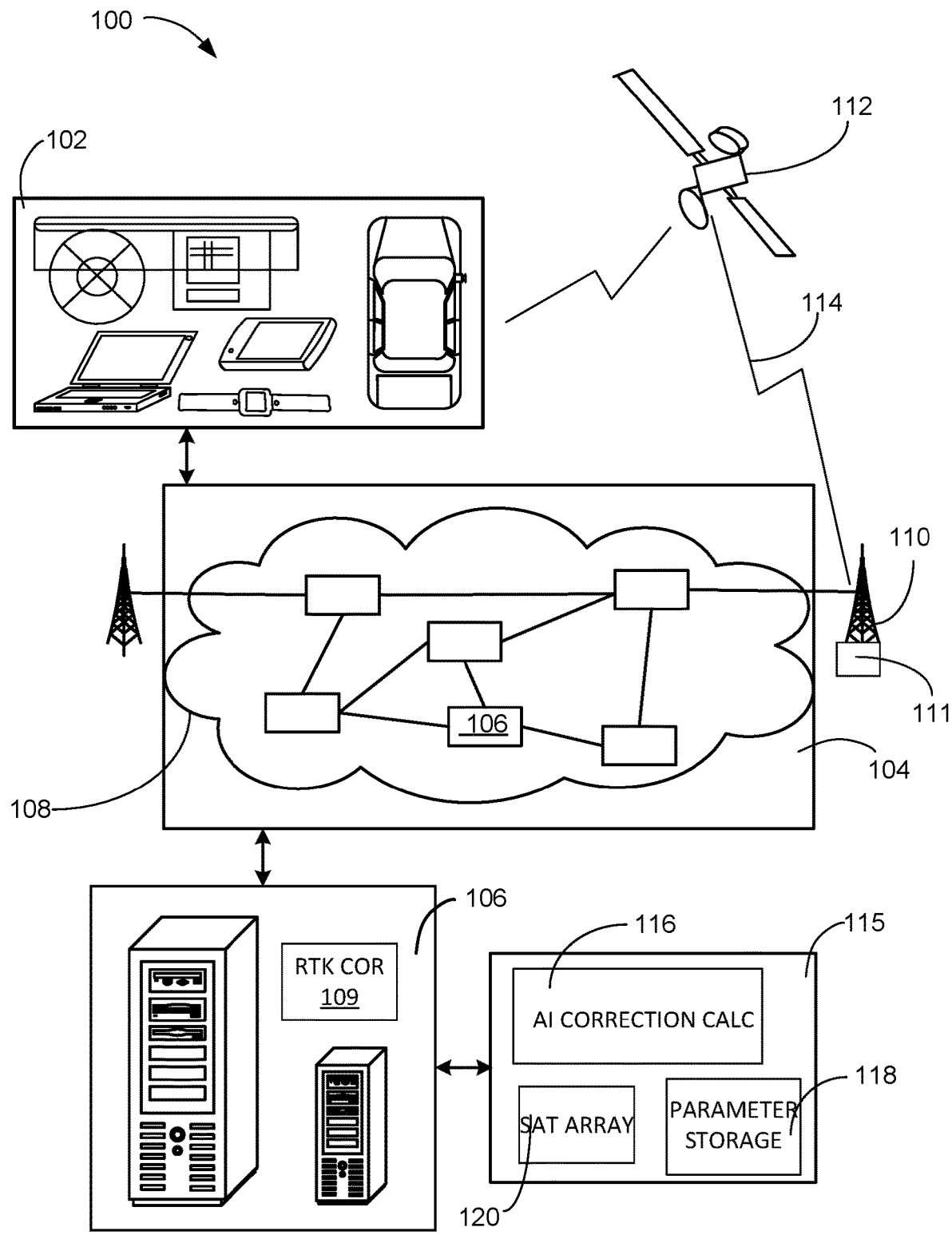
FIG. 1 is a block diagram of a navigation system with a location correction mechanism in an embodiment of the present invention.

The following embodiments can improve accuracy of identifying the physical location of a vehicle, which enables vehicle movement control for operating or controlling physical movement of the vehicle without the use of expensive sensors that can reduce the overall reliability of the vehicle. The vehicle movement control can be based on a driver assisted or an autonomous vehicle driving process that is safe and reliable due to the accuracy of the location correction mechanism. The navigation system with location correction mechanism can maintain centimeter level accuracy without the addition of expensive and unreliable sensors that elevate the cost of ownership of the driver assisted or the autonomous vehicle.

The vehicle movement control can further be based on accurately identifying physical location to centimeter accuracy on a real-time basis in order to assure the driver assisted or autonomous vehicle can be operated without risk of damage to the vehicle or any adjacent objects or property.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments of various components as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y, Z); where X and Y and Z are three coordinates that define the geographic location, i.e., a position of a vehicle.

The term "module" referred to herein can include or be implemented as or include software running on specialized hardware, hardware, or a combination thereof in the present invention in accordance with the context in which the term is used. For example, the software can be machine code, firmware, embedded code, and application software. The software can also include a function, a call to a function, a code block, or a combination thereof.

Also, for example, the hardware can be gates, circuitry, processor, computer, integrated circuit, integrated circuit cores, memory devices. a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "unit" is written in the system claims section below, the "unit" is deemed to include hardware circuitry for the purposes and the scope of the system claims.

The "units" in the following description of the embodiments can be hardware structures or functions coupled or attached to one another as described or as shown. The coupling or attachment can be direct or indirect without or with intervening items between coupled or attached modules or units. The coupling or attachment can be by physical contact or by communication between modules or units, such as wireless communication.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different.

Referring now to FIG. 1, therein is shown a block diagram of a navigation system 100 with a location correction mechanism in an embodiment of the present invention. The navigation system 100 can include a first device 102, such as a client or a server, connected to a second device 106, such as a cloud server included in a cloud 108 of the second device 106. The cloud 108 can be a loosely coupled computing structure, including the second device 106 that can provide computer resources and storage through a cloud network 104.

The navigation system 100 can include a base station 110 configured to communicate with a position satellite 112. The first device 102 can communicate with the second device 106 through the cloud network 104, such as a wireless or wired network of computing resources. The base station 110 can be a hardware structure, or tower, that includes electronics configured to communicate with the position satellite 112, and the second device 106. The position satellite 112 can be a hardware and electronic package orbiting the Earth at approximately 20,200 kilometers above the surface of the Earth. The position satellite 112 is configured to provide a position signal 114 to the first device 102.

For example, the first device 102 can be of any of a variety of computing devices, such as a cellular phone, personal digital assistant, a notebook computer, a wearable device, internet of things (IoT) device, automotive telematics navigation system, or other multi-functional device. Also, for example, the first device 102 can include a device or a sub-system, an autonomous or self-maneuvering vehicle or object, a driver assisted vehicle, a remote-controlled vehicle or object, or a combination thereof.

The first device 102 can couple, either directly or indirectly, to the cloud network 104 to communicate with the second device 106 or can be a stand-alone device. The first device 102 can further be separate form or incorporated with a vehicle, such as a car, truck, bus, or motorcycle.

For illustrative purposes, the navigation system 100 is described with the first device 102 as a mobile computing device, although it is understood that the first device 102 can be different types of devices. For example, the first device 102 can also be a mobile computing device carried within the vehicle and configured to identify a physical position of the vehicle.

The second device 106 can be any of a variety of centralized or decentralized computing devices. For example, the second device 106 can be a cloud computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the cloud network 104 to communicate with the first device 102. The second device 106 can also have significantly more computing power than the first device 102.

For illustrative purposes, the navigation system 100 is described with the second device 106 as a non-mobile cloud computing device, although it is understood that the second device 106 can be different types of computing devices. For example, the second device 106 can also be a mobile computing device, such as notebook computer, another client device, a wearable device, or a different type of client device.

Also, for illustrative purposes, the navigation system 100 is described with the second device 106 as a computing device, although it is understood that the second device 106 can be different types of devices. Also, for illustrative purposes, the navigation system 100 is shown with the second device 106 and the first device 102 as endpoints of the cloud network 104, although it is understood that the navigation system 100 can include a different partition between the first device 102, the second device 106, and the cloud network 104. For example, the second device 106 can also function as part of the cloud network 104.

The cloud network 104 can span and represent a variety of networks. For example, the cloud network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the cloud network 104. Further, the cloud network 104 can traverse a number of network topologies and distances. For example, the cloud network 104 can include direct connection, personal area network (PAN), local area network (LAN), metropolitan area network (MAN), wide area network (WAN), or a combination thereof.

The navigation system 100 can provide additional features that are not available in prior art navigation systems. The first device 102 can be coupled to the positioning satellite 112. The positioning satellite 112 can be a portion of a satellite array (not shown) that is configured to provide the physical position of the first device 102. The communication between the first device 102 and the positioning satellite 112 can provide the position of the first device 102 within a five meter to ten meter accuracy. While this accuracy is sufficient for prompting a driver for changes in route, it cannot support an autonomous vehicle without adding expensive sensors that can increase the cost of the first device 102 and reduce the reliability due to sensor frailty.

The inaccuracies of the position provided by the positioning satellite 112 can be caused by errors including satellite clock bias, satellite orbital error, ionospheric delay, tropospheric delay, multipath interference, and receiver thermal noise. The base station 110 can be located in an actual location 111, such as a well-defined and known location. The base station 110 can be a satellite receiver/transmitter that samples the position signal 114 in order to mitigate as many of the inaccuracies as possible. The base station 110 can communicate the position signal 114, received from the positioning satellite 112, to the second device 106 for analysis and correction.

The second device 106 can be coupled to or include a location correction module 115, such as a signal evaluation module, that can be implemented in software running of specialized hardware, full hardware, or a combination thereof configured to analyze the position signal 114. The location correction module 115 can compare the position signal 114 received from the first device 102 and the base station 110. During a training process, the first device 102 can upload the position signal 114 to the second device 106 for further analysis or to generate a real-time kinematics (RTK) correction 109. The location correction module 115 can include an artificial intelligence (AI) correction calculator 116, such as a neural network, that can be trained to perform double difference calculations of the position signal 114 received from the base station 110 and the first device 102. The AI correction calculator 116 can consider the first device 102 is in close proximity to the base station 110, even with a distance of 100 kilometers between them, because the separation distance is insignificant relative to the altitude of the position satellite 112, substantially 22,200 kilometers in altitude, resulting in a difference angle of less than a degree.

This will allow the satellite orbital error, ionospheric delay, tropospheric delay, multipath interference to be cancelled out as being equal for the base station 110 and the first device 102. Due to the geometric relationship between the first device 102, the base station 110, and the position satellite 112, the values of the satellite orbital error, the ionospheric delay, the tropospheric delay, and the multipath interference are substantially equal and can be negated.

The location correction module 115 can include the AI correction calculator 116, a parameter storage 118, and a satellite array storage 120 that can store parametric information for each of the position satellite 112 visible in the sky at a particular time. It is understood that the global positioning system requires four of the position satellites 112 in order to define a single point on the globe. The position satellite 112 can have a highly predictable orbit and can move through the region covered by the base station 110 in a known periodic fashion.

The parameter storage 118 can be a volatile or non-volatile memory configured to maintain parameters and the RTK correction 109, related to specific ones of the positioning satellite 112, for a specific one of the base station 110. It is understood that the second device 106 can provide the RTK correction 109 for several of the base station 110 and the array of the position satellite 112.

The satellite array storage 120 can be a volatile or non-volatile memory configured to store the frequency, orbital parameters, approximate altitude, and horizon timeline for each of the position satellite 112 that crosses over the region covered by the base station 110. By way of an example, a standard global positioning system requires a minimum of four of the position satellite 112 in order to define a single point in the region. In order to support the minimum requirement, at least six of the position satellite 112 can be identified over the region at any time.

Since the base station 110 is located at the actual location 111, such as a well defined and precise location, the base station 110 can sample each of the position satellite 112 that services the region around the base station 110. By periodically updating the parametric information from the position signal 114, the base station 110 can allow the second device 106 to quickly respond with the RTK correction 109 for the first device 102.

Training of the AI correction calculator 116 can be accomplished by collecting readings from two of the base station 110 for one of the position satellite 112 that is visible to both. The second device 106 can monitor the position signal 114 received by both of the base station 110. Since the actual location 111 of the base station 110 is known, the AI calculator can resolve the location discrepancies for both of the base station 110. When the first device 102 enters the region within five to ten kilometers of the base station 110, the first device 102 can relay its position, as determined by the position signal 114, to the second device 106 for correction. The second device 106 can return the RTK correction 109 to the first device 102. By applying the RTK correction 109, the first device 102 can calibrate its position to within a few centimeters.

It has been discovered that the navigation system 100 can reliably identify the RTK correction 109 in order to provide real-time updates of the actual position 111 for the first device 102. The RTK correction 109 can be calculated by the AI correction calculator 116 over a fixed period of time in order to support the first device 102. By sending the RTK correction 109 from the second device 106, a communication can be distributed to other users of the navigation system 100 for determining their actual location 111. The navigation system 100 can improve determination of the actual location 111 of the first device 102, which can allow operation of autonomous vehicles without the support of expensive and unreliable sensors.

Figure 2:
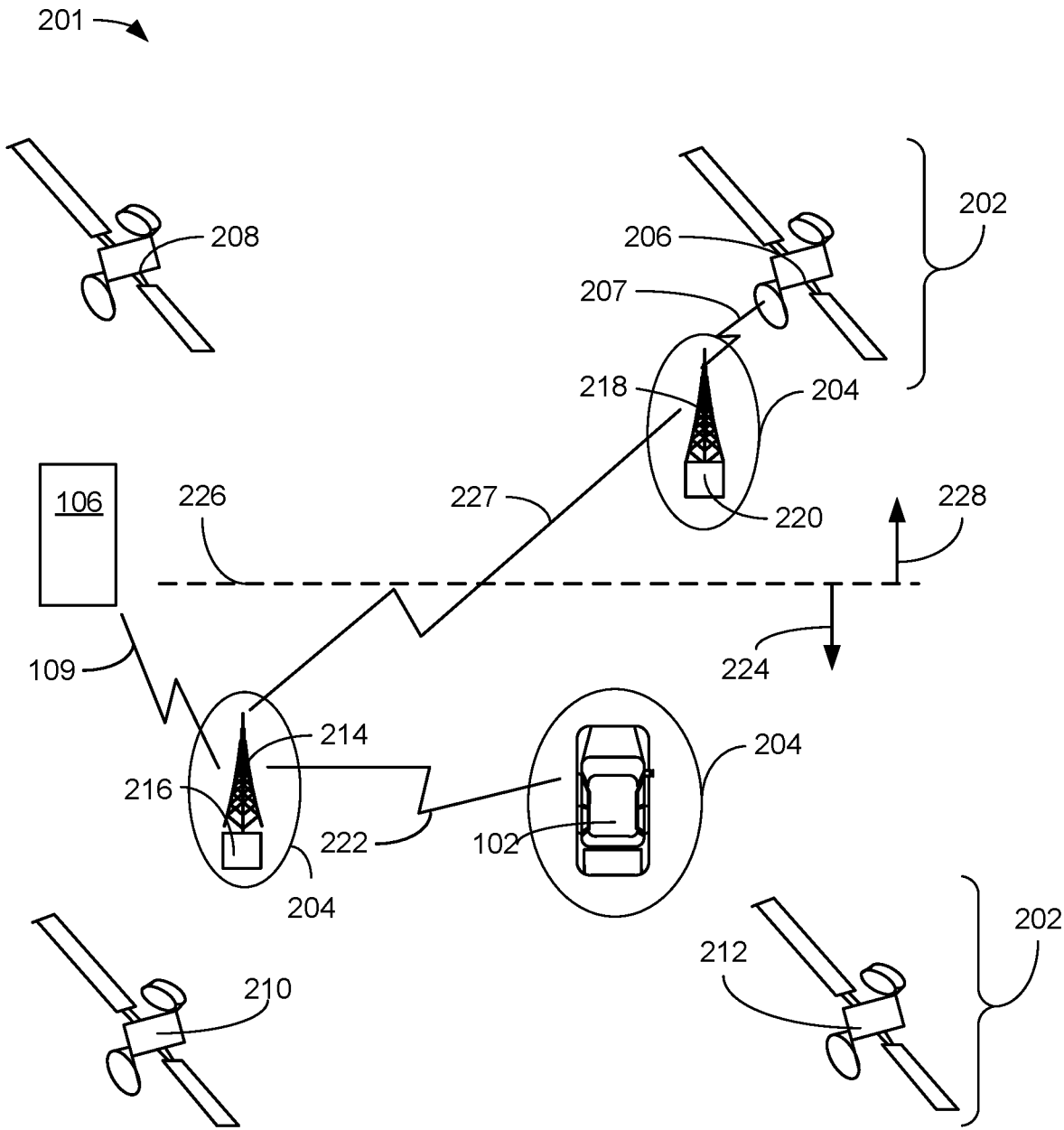
FIG. 2 is an example architecture view of the navigation system in an embodiment.

Referring now to FIG. 2, therein is shown an example a top plan view 201 of the navigation system 100 of FIG. 1 in an embodiment. The navigation system 100 can include or interact with a satellite array 202 that communicates a satellite provided reference location 204 to the first device 102. The satellite array 202 can include a first position satellite 206, a second position satellite 208, a third position satellite 210, and a fourth position satellite 212. It is understood that the identification of the satellite provided reference location 204 requires a minimum of four of the position satellite 112 of FIG. 1 and additional ones of the position satellite 112 can be added for additional reliability.

The satellite provided reference location 204 can only maintain an accuracy of one to five meters around the first device 102. While this level accuracy was sufficient for navigation assistance of an operator based vehicle, it causes an autonomous vehicle to add expensive and unreliable optical and radar sensors to keep the vehicle safely within the lane markers and on the selected path.

The first device 102 can be an object or a machine used for transporting people or goods capable of automatically maneuvering or operating the object or the machine. The first device 102 can include vehicles accessible by a user for control, maneuver, operation, or a combination thereof. For example, the first device 102 can include a car, a truck, a cart, a drone, or a combination thereof.

For example, the first device 102 can include a self-driving vehicle, or a vehicle with automatic maneuvering features, such as smart cruise control or preventative breaking. The first device 102 can include a smart cruise control feature, capable of setting and adjusting the travel speed of the first device 102. The satellite array 202 can also be in communication with a first base station 214, located at a first actual position 216, and a Qth base station 218, located at a Qth actual position 220. The first base station 214 and the Qth base station 218 can also be coupled to the second device 106, located in the cloud 108 of FIG. 1. It is understood that the first base station 214 and the Qth base station 218 can each be communication with a different one of the second device 106 as well as each other. The second device 106 can utilize the first actual position 216 and the Qth actual position 220 to train the AI correction calculator 116 to correct the satellite provided reference location 204 sent from the first base station 214 and the Qth base station 218. It is understood that the value of "Q" is a positive integer greater than 1. The addition of multiple instances of the base station 110 of FIG. 1 can implement a sea of RTK cells by each of the base stations 110 communicating with the second device 106 through the cloud network 104.

When the first device 102 receives the satellite provided reference location 204 from the satellite array 202, the satellite provided reference location 204 can be transferred to the first base station 214 through an over the air (OTA) communication 222. The first base station 214 can forward the satellite provided reference location 204 to the second device 106. The second device 106 can perform the RTK calculations by the AI correction calculator 116 of FIG. 1 and instruct the first base station 214 to transfer the result of the AI correction calculator 116 to the first device 102. The second device 106 can monitor the OTA communication 222 between the first base station 214 and the device 102 to determine when the first device 102 will cross a cell boundary 226. The second device 106 can initiate a parameter transfer 227 between the first base station 214 and the Qth base station 218 in preparation for the first device 102 crossing from a first RTK cell 224 to a Qth RTK cell 228. The parameter transfer 227 can include a pseudorange of the first position satellite 206, a carrier phase 207 of the first position satellite 206, a carrier phase ambiguity calculated by the AI correction calculator 116, an estimated clock error of the first position satellite 206, a computed position of the first device 102 in the first RTK cell 224, and a list of the satellite array 202 used to locate the first device 102. The first RTK cell 224 and Qth RTK cell 228 are defined to be geographic areas serviced by a specific subset of the satellite array 202. The carrier phase 207 is defined as the shifting of the carrier frequency due to the delay generated by the atmospheric layers. It is understood that the carrier phase 207 can remain substantially constant within the first RTK cell 224 and Qth RTK cell 228 because the separation distance of 20 KM between the base station 110 and the first device 102 results in the elevation angle change, to the position satellite 112, between the base station 110 and the first device 102 to only differ in the range of 0.056 degrees.

The AI correction calculator 116 of the second device 106 can perform the RTK calculation to determine the actual position 111 of FIG. 1 of the first device 102 with centimeter accuracy. Under a single baseline condition, the global navigation satellite system (GNSS) receivers at both ends are named "base", for the base station 110, and "rover", for the first device 102, (subscripts "b" and "r" are used in equations) respectively in accordance with equation. The pseudorange "ρ" is defined as corrected range of the orbit altitude of the position satellite 112, as shown in equations 1 and 2. The carrier phase 207 "ϕ" is defined as the shifting of the carrier frequency due to the delay generated by the atmospheric layers as shown in equations 3 and 4. The carrier phase 207 "ϕ" and the pseudorange "ρ" measurements from a certain satellite j of the satellite array 202 observed by the two receivers of the first base station 214 and the Qth base station 218 at a certain instance of time can be written as:

$$\rho j, r = \lambda - 1(rj, r + Ij, r + Tj, r) + f(\delta tr - \delta tj) + \epsilon j, r \quad (1)$$

$$\rho j, b = \lambda - 1(rj, b + Ij, b + Tj, b) + f(\delta tb - \delta tj) + \epsilon j, b \quad (2)$$

$$\phi j, r = \lambda - 1(rj, r - Ij, r + Tj, r) + f(\delta tr - \delta tj) + Nj, r + \eta j, r \quad (3)$$

$$\phi j, b = \lambda - 1(rj, b - Ij, b + Tj, b) + f(\delta tb - \delta tj) + Nj, b + \eta j, b \quad (4)$$

where ρ and ϕ are pseudorange and carrier phase 207 measurements (unit: carrier cycle), respectively, λ is the carrier wavelength (unit: m), r represents the true geographical distance between the satellite and the receiver (unit: m), T is the tropospheric delay (unit: m), I is the ionospheric delay (unit: m), f is the carrier frequency (unit: Hz), δtr is the receiver clock error (unit: s), δtj is the satellite clock error (unit: s), N is the integer ambiguity, ε and η are measurement errors of pseudorange and carrier phase 207 respectively and their variances can be modeled as a simplified function of the elevation angle as given by Equation (5):

$$\sigma^2 = a(b + b/\sin^2\theta)/\lambda^2 \quad (5)$$

where θ is the elevation angle of the satellite, a and b can be set empirically, for example, we can select a=1 and b=9e$^{-6}$ for carrier phase 207. It is understood that the difference in the elevation angle θ between the base station 10 and the first device 102 is substantially same, because the separation of 10-20 kilometers as compared to the elevation of the position satellite 112, which is substantially 20,200 kilometers. By way of an example, the elevation angle change between the base station 110 and the first device 102 can differ in the range of 0.028 degrees and 0.056 degrees. As such the tropospheric delay "T" and the ionospheric delay "I" can be assumed to be equal for the base station 110 and the first device 102.

The single-differenced (SD) measurement model can be obtained by subtracting the base receiver's from the rover receiver's measurements, i.e., Equation (1)-Equation (2) and Equation (3)-Equation (4):

$$\rho j, rb = \lambda - 1(rj, rb + Ij, rb + Tj, rb) + f\delta trb + \epsilon j, rb \tag{6}$$

$$\phi j, rb = \lambda - 1(rj, rb - Ij, rb + Tj, rb) + f\delta trb + Nj, rb + \eta j, rb \tag{7}$$

where the subscript "rb" represents the difference between the corresponding terms of rover and base. It can be seen that $\delta tj$ as a common error is eliminated by this differencing.

In the above equation receiver and satellite clock offsets and hardware biases cancel out. The single difference ambiguities difference N12a–N12b is commonly parameterized as a new ambiguity parameter N12ab. The advantage of double differencing is that the new ambiguity parameter N12ab is an integer because the non-integer terms in the GPS carrier phase 207 observation, due to clock and hardware delays in the transmitter and receiver, are eliminated.

Although it would be possible to estimate the double difference ambiguity using a float approach instead of an integer one, this would lead to less accuracy, such as dm-level accuracy instead of cm-level. Hence, standard RTK limits the ambiguities to integer figures. Since the first actual position 216 of the first base station 214 is known to the second device 106, it can return the RTK correction 109 for the first device 102 based on corrections generated for the base station 110.

As the first device 102 proceeds through a first RTK cell 224 and approaches the cell boundary 226, The second device 106 cause the first base station 214 to transfer the RTK parameters necessary for centimeter positioning to the Qth base station 218 in preparation for the first device 102 to enter the Qth RTK cell 228. It is understood that the second device 106 can anticipate the transition of the first device 102 into the Qth RTK cell 228. By way of an example, if the first device 102 is travelling at 60 miles per hour (MPH) approaching the cell boundary 226, the first device 102 will travel just 1.056 inches in one millisecond. The first RTK cell 224 and the Qth RTK cell 228 can be formed around the first base station 214 and the Qth base station 218, respectively. Additional base stations 110 can be added in the region to form a sea of RTK cells (not shown).

In preparation for the first device 102 crossing into the Qth RTK cell 228, the second device 106 can update critical parameters in the Qth base station 218, including positions, pseudoranges, carrier phase 207 measurements, and corresponding integer ambiguity. The Qth base station 218 can receive the necessary parameters to continue to provide centimeter level position accuracy for the first device 102.

It has been discovered that the navigation system 100 can provide the RTK correction 109 for the first device 102 by transferring the satellite provided reference location 204 to the second device 106. The second device 106 can be a cloud server as part of the cloud network 104. The second device 106 can process the satellite provided reference location 204 through the AI correction calculator 116 and determine the RTK correction 109. By transferring the RTK correction 109 back to the first device 102, centimeter position accuracy can be maintained. The transfer of critical parameters to the Qth base station 218, including positions, pseudoranges, carrier phase 207 measurements, a list of satellites 117 used from the satellite array 202, and corresponding integer ambiguity that were calculated by the AI correction calculator 116, allows the first device 102 to drive across the cell boundary 226 from the first RTK cell 224 to the Qth RTK cell 228, while maintaining the centimeter level position accuracy.

Figure 3:
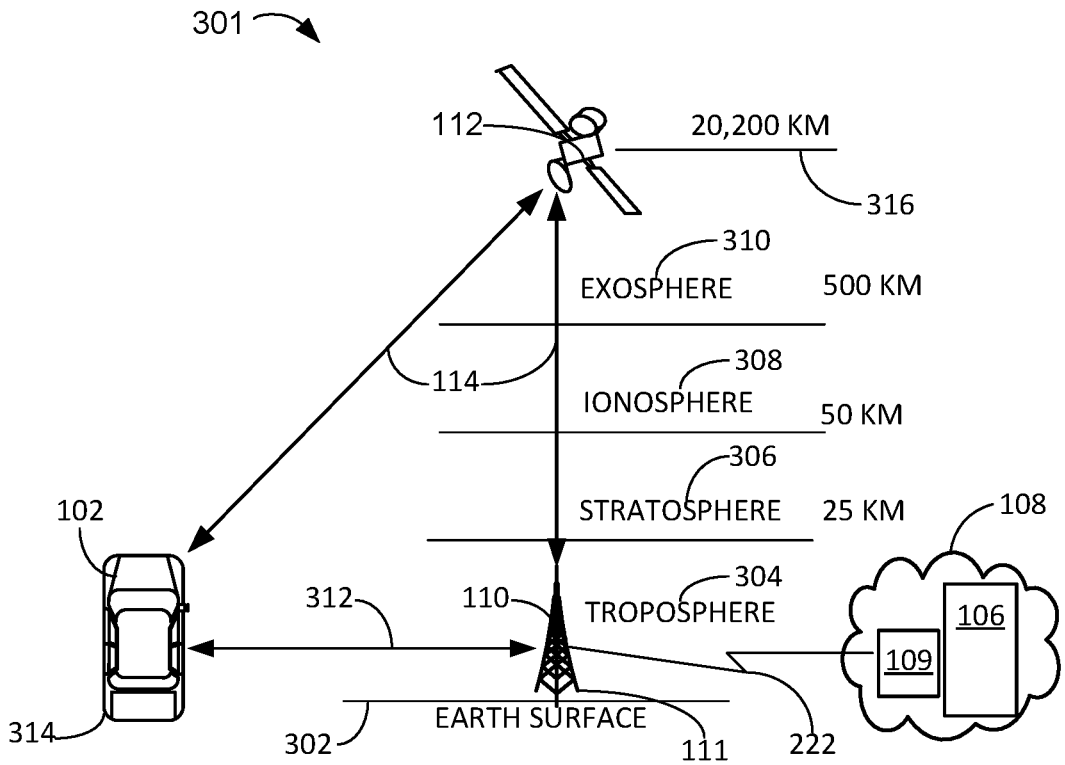
FIG. 3 is an exemplary elevation view processed by the navigation system.

Referring now to FIG. 3, therein is shown is an exemplary elevation map 301 processed by the navigation system 100. The exemplary elevation map 301 can include the base station 110 fixed at the actual location 111 on the Earth surface 302. The base station 110 can communicate with the second device 106, located in the cloud 108, by the over the air (OTA) communication 222. The base station 110 can also communicate with the position satellite 112 and the first device 102 for determining the actual location of the first device 102.

The position satellite 112 can transmit the position signal 114 to both the first device 102 and the base station 110. The position signal 114 must penetrate several layers of the atmosphere including a tropospheric layer 304, a stratospheric layer 306, an ionospheric layer 308, and an exospheric layer 310. The tropospheric layer 304 extends from the Earth surface 302 up to an altitude of approximately 25 kilometers, where it borders the stratospheric layer 306. The tropospheric layer 304 presents a significant amount of electrical noise and radiated energy that can impact the position signal 114 by causing phase shift delay.

The stratospheric layer 306 can be a benign layer that extends from the top of the tropospheric layer 304 at 25 kilometers up to approximately 50 kilometers. The stratospheric layer 306 can be electrically stable and poses little impact on the position signal 114. The stratospheric layer 306 can border the ionospheric layer 308, which extends from approximately 50 kilometers to 500 kilometers. The ionospheric layer 308 can contain high amounts of ionized gases, including the ozone layer. The ionospheric layer 308 can impact the position signal 114 due to ionic gases shifting the phase and delaying the position signal 114.

The exospheric layer 310 can border the ionospheric layer 308 and can extend from approximately 500 kilometers to 60,000 kilometers. The exospheric layer 310 can be a partial vacuum, containing rare occurrences of ionized gas molecules. The position satellite 112 can orbit the Earth surface 302 at approximately 20,200 kilometers. At this altitude, the position satellite 112 can complete two orbits of the Earth in a single day.

The first device 102 can be in close proximity 312, in the range of 10-20 kilometers, to the base station 110. When the first device 102 receives the position signal 114, the impact of the ionospheric layer 308 and the tropospheric layer 304 induces an amount of uncertainty in the position of the first device 102. At the same time the base station 110 can receive the position signal 114 including the same uncertainty as the first device, but the actual position 111 of the base station 110 is well known to the second device 106. The second device 106 can process the position signal 114 received by the base station 110 in order to identify the uncertainty that was induced by the ionospheric layer 308 and the tropospheric layer 304. The second device 106 can use the AI correction calculator 116 of FIG. 1 to identify the uncertainty based on knowing the actual position 111 of the base station. Since the first device 102 is subject to the same uncertainty that the base station 110 experienced, the same correction that was identified for the base station 110 can apply to the first device 102.

The angular difference shown in FIG. 3 is for ease of description. In actuality, the angular difference between the base station 110 to the position satellite 112 and the first device 102 to the position satellite 112 is in the order of 0.028 to 0.056 degrees. Based on this, the position signal 114 will experience the same amount and direction of uncertainty to both the base station 110 and the first device 102. As such, the RTK correction 109 that applies to the base station 110 will correct the satellite provided reference location 204 of FIG. 2 to a real-world location 314 of the first device 102. The real-world location 314 is defined as the physical location on the surface of the Earth of the first device 102 provided with between one centimeter and three centimeters precision.

It has been discovered that the navigation system 100 of FIG. 1 can rely on the actual location 111 of the base station 110, submitted to the AI correction calculator 116 to identify a pseudorange p 316 and the carrier phase ϕ 207 of FIG. 2 from the position signal 114. By way of an example, the pseudorange 316 and the carrier phase 207 identified for the base station 110 can be applied to the first device 102 in order to calculate the real-world location 314 of the first device 102. Since the second device 106 performs the heavy computations through the AI correction calculator 116, the complexity of the first device 102 can be reduced to increase reliability and reduce cost by eliminating expensive optical and radar sensors that would be used to guide the first device 102 based on the less accurate satellite provided reference location 204 of FIG. 2.

Figure 4:
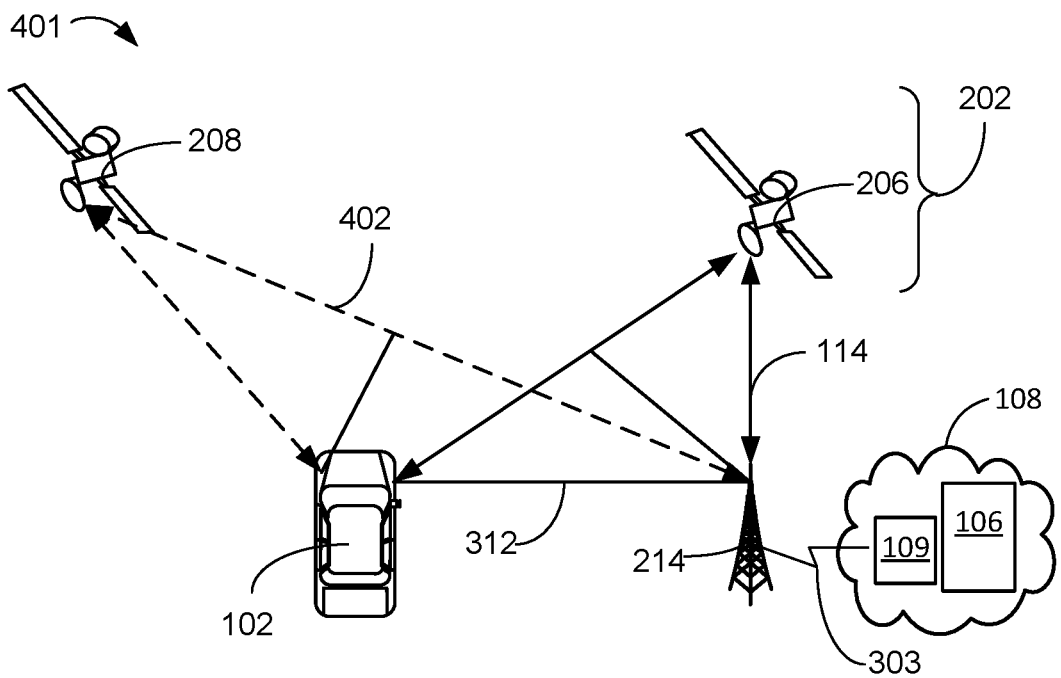
FIG. 4 is an exemplary elevation map of the satellite array processed by the navigation system.

Referring now to FIG. 4, therein is shown an exemplary elevation map 401 of the satellite array 202 processed by the navigation system 100 of FIG. 1. The exemplary elevation map 401 of the satellite array 202 depicts the first position satellite 206 and the second position satellite 208 in communication with the first base station 214 and the first device 102. The first base station 214 can also communicate with the cloud 108 by the OTA communication 222 to access the second device 106.

The first base station 214 can selectively process the position signal 114 from the first position satellite 206. The first base station 214 can sent the position signal 114 by way of the OTA communication 222 to the second device 106. The second device 106 can calculate the RTK correction 109 for the first position satellite 206 and the first device 102. When the RTK correction 109 for the first position satellite 206 is completed, the first base station 214 can select a second position signal 402 for processing by the second device 106.

By way of an example, the AI correction calculator 116 of FIG. 1 can use the same process and equations applied to the first position satellite 206 on the second position satellite 208. Since the viewing angle is different between the first base station 214 and the first position satellite 206 is significantly different from the viewing angle between the first base station 214 and the second position satellite 208, the amount of uncertainty applied to the second position signal 402 can be different from that of the first position signal 114. The first base station 214 can communicate the RTK correction 109 for each of the position satellites 112 of FIG. 1 in the satellite array 202.

The second device 106 can store the critical parameters including the pseudorange 316 of FIG. 3 and the carrier phase 207 of FIG. 2 identified for the first base station 214 in the parameter storage 118 of FIG. 1 and the schedule of access for the first satellite 206 and the second satellite 208 can be stored in the satellite array storage 120 of FIG. 1. When the AI correction calculator 116 is in training, pairs of the base station 110 of FIG. 1 can communicate concurrent information for each of the position satellite 112 of FIG. 1 in the satellite array 202. The RTK correction 109 for each of the position satellite 112 in the satellite array 202 can be stored in the satellite array storage 120 for faster retrieval once training is complete.

It has been discovered that second device 106 located in the cloud 108 can quickly retrieve critical parameters including actual location 111 of FIG. 1 of the base station 110, pseudorange 316 of FIG. 3 of the position satellite 112, carrier phase 207 measurements, and corresponding integer ambiguity. The storage of relevant information for each of the position satellite 112 in the satellite array 202 can decrease the time spent in calculating the RTK correction 109. The storage of the critical parameters can simplify the forwarding of the centimeter level position support when the first device 102 crosses from the first RTK cell 224 of FIG. 2 to the Qth RTK cell 228 of FIG. 2. Since the critical parameters are transferred from the first base station 214 to the Qth base station 218 of FIG. 2, a quick retrieval of those parameters from the second device 106 can shorten the time required for the transfer and maintain the centimeter level position monitoring when crossing the cell barrier 226 of FIG. 2.

Figure 5:
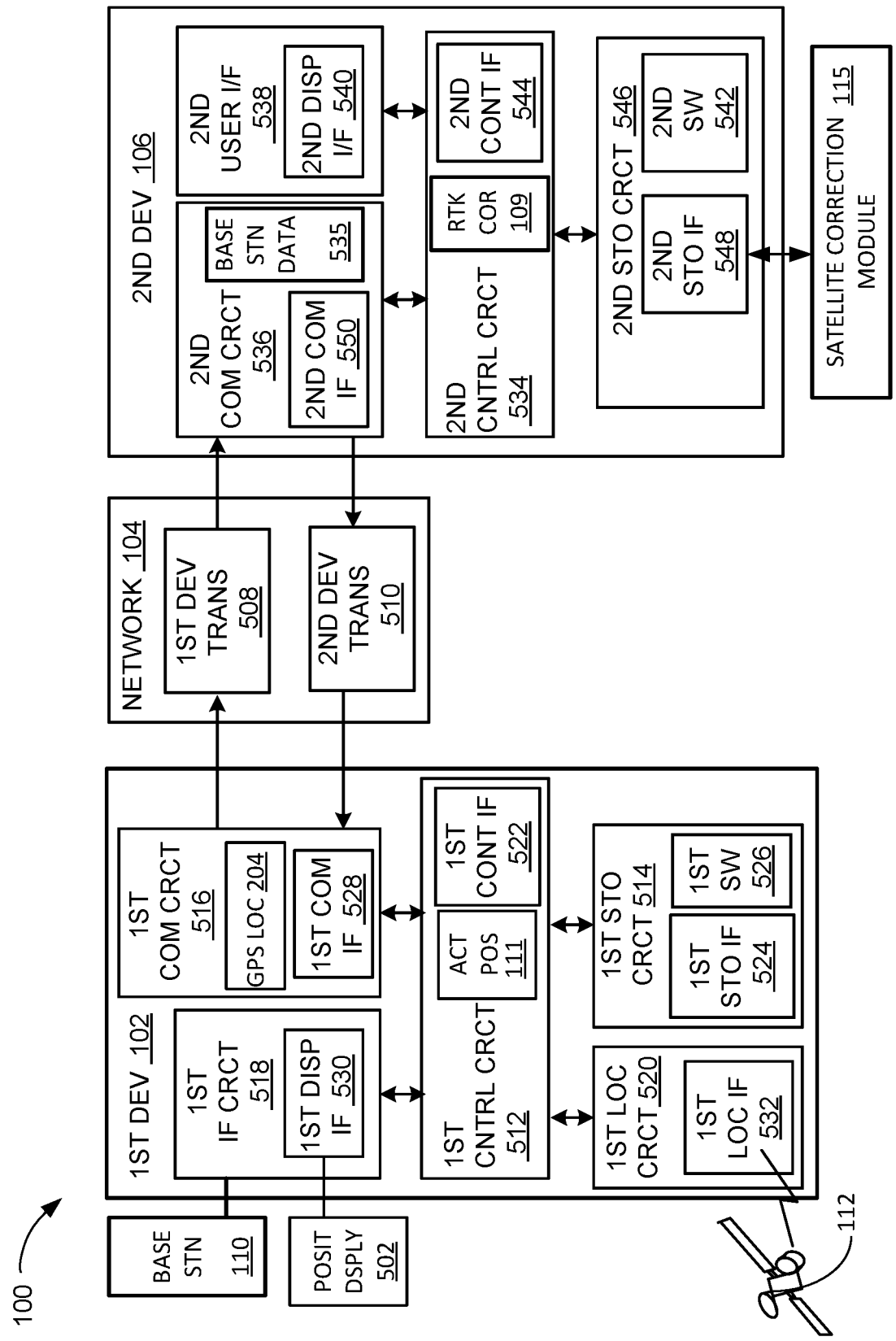
FIG. 5 is an exemplary block diagram of the navigation system in an embodiment.

Referring now to FIG. 5, therein is shown an exemplary block diagram of the navigation system 100 in an embodiment. The navigation system 100 can include the first device 102, the cloud network 104, and the second device 106. The first device 102 can send information in a first device transmission 508 over the cloud network 104 to the second device 106. The second device 106 can send information in a second device transmission 510 over the cloud network 104 to the first device 102 or to the base station 110 of FIG. 1.

For illustrative purposes, the navigation system 100 is shown with the first device 102 as a client device, although it is understood that the navigation system 100 can include the first device 102 as a different type of device. For example, the first device 102 can be a server containing the first display interface 530 coupled to a position display 502. The position display 502 can include a monitor, projector, heads-up display, or a liquid crystal display configured to display the actual position 111 of the first device 102

Also, for illustrative purposes, the navigation system 100 is shown with the second device 106 as a cloud server, although it is understood that the navigation system 100 can include the second device 106 as a different type of device. For example, the second device 106 can be a client device. The second device 106 can provide training and enhancement of the AI correction calculator 116 of FIG. 1.

Also, for illustrative purposes, the navigation system 100 is shown with interaction between the first device 102 and the second device 106. However, it is understood that the first device 102 can be a part of or the entirety of an autonomous vehicle, a smart vehicle, or a combination thereof. Similarly, the second device 106 can similarly interact with the first device 102 representing the autonomous vehicle, the intelligent vehicle, or a combination thereof.

For brevity of description in this embodiment of the present invention, the first device 102 will be described as a client device and the second device 106 will be described as a cloud server device. The embodiment of the present invention is not limited to this selection for the type of devices. The selection is an example of an embodiment of the present invention.

The first device 102 can include a first control circuit 512, a first storage circuit 514, a first communication circuit 516, a first interface circuit 518, and a first location circuit 520. The first control circuit 512 can include a first control interface 522. The first control circuit 512 can execute a first software 526 to provide the intelligence of the first device 102.

The first control circuit 512 can be implemented in a number of different manners. For example, the first control circuit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control circuit 512 and other functional units or circuits in the first device 102. The first control interface 522 can also be used for communication that is external to the first device 102.

The first control interface 522 can receive information from the other functional units/circuits or from external sources, or can transmit information to the other functional units/circuits or to external destinations. The external sources and the external destinations refer to sources and destinations external to the first device 102.

The first control interface 522 can be implemented in different ways and can include different implementations depending on which functional units/circuits or external units/circuits are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first storage circuit 514 can store the first software 526. The first storage circuit 514 can also store the relevant information, such as data representing incoming images, satellite data representing the satellite array 202 of FIG. 2, sound files, or a combination thereof.

The first storage circuit 514 can be a volatile memory, a nonvolatile memory, an internal memory, an external memory, or a combination thereof. For example, the first storage circuit 514 can be a nonvolatile storage such as non-volatile random-access memory (NVRAM), Flash memory, disk storage, or a volatile storage such as static random-access memory (SRAM).

The first storage circuit 514 can include a first storage interface 524. The first storage interface 524 can be used for communication between the first storage circuit 514 and other functional units or circuits in the first device 102, such as the sensor data local storage 108 of FIG. 1. The first storage interface 524 can also be used for communication that is external to the first device 102.

The first storage interface 524 can receive information from the other functional units/circuits or from external sources, or can transmit information to the other functional units/circuits or to external destinations. The external sources and the external destinations refer to sources and destinations external to the first device 102.

The first storage interface 524 can include different implementations depending on which functional units/circuits or external units/circuits are being interfaced with the first storage circuit 514. The first storage interface 524 can be implemented with technologies and techniques similar to the implementation of the first control interface 522.

The first communication circuit 516 can enable external communication to and from the first device 102. For example, the first communication circuit 516 can permit the first device 102 to communicate with the second device 106 and the cloud network 104. By way of an example, the first communication circuit 516 can transfer the satellite provided reference location 204 to the second device 106 for correction by the satellite correction module 115.

The first communication circuit 516 can also function as a communication hub allowing the first device 102 to function as part of the cloud network 104 and not limited to be an endpoint or terminal circuit to the cloud network 104. The first communication circuit 516 can include active and passive components, such as microelectronics or an antenna, for interaction with the cloud network 104.

The first communication circuit 516 can include a first communication interface 528. The first communication interface 528 can be used for communication between the first communication circuit 516 and other functional units or circuits in the first device 102. By way of an example, the first communication interface 528 can receive the satellite provided reference location 204 from the first control circuit 512. The first communication interface 528 can receive information from the second device 106 for distribution to the other functional units/circuits or can transmit information to the other functional units or circuits.

The first communication interface 528 can include different implementations depending on which functional units or circuits are being interfaced with the first communication circuit 516. The first communication interface 528 can be implemented with technologies and techniques similar to the implementation of the first control interface 522.

The first interface circuit 518 allows the base station 110 of FIG. 1 to interface and interact with the first device 102. The first interface circuit 518 can include an input device and an output device. Examples of the input device of the first interface circuit 518 can include a keypad, a touchpad, soft-keys, a keyboard, a microphone, an infrared sensor for receiving remote signals, the wireless receiver, or any combination thereof to provide data and communication inputs. The first interface circuit 518 can pass the input from the base station 110 to the first control circuit 512 for processing and storage.

The first interface circuit 518 can include a first display interface 530. The first display interface 530 can include an output device. The first display interface 530 can couple the position display 502 including a projector, a video screen, a touch screen, a speaker, and combinations thereof.

The first control circuit 512 can operate the first interface circuit 518 to display information generated by the navigation system 100. The first control circuit 512 can also execute the first software 526 for the other functions of the navigation system 100, including receiving location information from the first location circuit 520. The first control circuit 512 can further execute the first software 526 for interaction with the cloud network 104 via the first communication circuit 516. The first control unit 512 can operate the RTK correction 109 for determining the actual position 111.

The first control circuit 512 can operate the first interface circuit 518 to collect data from the base station 110. The first control circuit 512 can also receive location information from the first location circuit 520.

The first location circuit 520 can generate location information in the real-world coordinates, current heading, current acceleration, and current speed of the first device 102, as examples. The first location circuit 520 can be implemented in many ways. For example, the first location circuit 520 can function as at least a part of the global positioning system, an inertial navigation system, a cellular-tower location system, a gyroscope, or any combination thereof. Also, for example, the first location circuit 520 can utilize components such as an accelerometer, gyroscope, or global positioning system (GPS) receiver.

The first location circuit 520 can include a first location interface 532. The first location interface 532 can be used for communication between the first location circuit 520 and other functional units or circuits in the first device 102, including the optical sensor 110.

The first location interface 532 can receive information from the other functional units/circuits or from external sources, or can transmit information to the other functional units/circuits or to external destinations. The external sources and the external destinations refer to sources and destinations external to the first device 102, such as the position satellite 112.

The first location interface 532 can include different implementations depending on which functional units/circuits or external units/circuits are being interfaced with the first location circuit 520. The first location interface 532 can be implemented with technologies and techniques similar to the implementation of the first control circuit 512.

The second device 106 can be optimized for implementing an embodiment of the present invention in a multiple device embodiment with the first device 102. The second device 106 can provide the additional or higher performance processing power compared to the first device 102. The second device 106 can include a second control circuit 534, a second communication circuit 536, a second user interface 538, and a second storage circuit 546.

The second user interface 538 allows an operator (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

During the training process, the second control circuit 534 can receive a base station data 535 through the second communication circuit 536. By way of an example, the second control circuit 536 can receive the base station data 535 from the first base station 214 of FIG. 2 and the Qth base station 218 of FIG. 2. The first base station 214 and the Qth base station 218 can communicate their base station data 535, including the satellite provided reference location 204 and the actual location 111 to the second device 106. The base station data 535 can be passed to the satellite correction module 115 for training the AI correction calculator 116 of FIG. 1 The actual location 111 of the first base station 214 and the Qth base station 218 is known to the satellite correction module 115. The base station data 535 can include the first actual position 216 of the first base station 214, and the Qth actual position 220 of the Qth base station 218, and a satellite provided reference location 204 of FIG. 2, for the first base station 214 and the Qth base station 218, received from satellite array 202. The satellite correction module 115 can resolve the critical parameters that can convert the satellite provided reference location 204 to the actual location 111 of the base station. The critical parameters can be compiled in the RTK correction 109 that is sent to the first device 102.

The second control circuit 534 can execute a second software 542 to provide the intelligence of the second device 106 of the navigation system 100. The second software 542 can operate in conjunction with the first software 526. The second control circuit 534 can provide additional performance compared to the first control circuit 512.

The second control circuit 534 can operate the second user interface 538 to display information. The second control circuit 534 can also execute the second software 542 for the other functions of the navigation system 100, including operating the second communication circuit 536 to communicate with the first device 102 over the cloud network 104.

The second control circuit 534 can be implemented in a number of different manners. For example, the second control circuit 534 can be a processor, an embedded processor, a microprocessor, hardware control logic, a hardware finite state machine (FSM), a digital signal processor (DSP), or a combination thereof.

The second control circuit 534 can include a second control interface 544. The second control interface 544 can be used for communication between the second control circuit 534 and other functional units or circuits in the second device 106. The second control interface 544 can also be used for communication that is external to the second device 106.

The second control interface 544 can receive information from the other functional units/circuits or from external sources, or can transmit information to the other functional units/circuits or to external destinations. The external sources and the external destinations refer to sources and destinations external to the second device 106.

The second control interface 544 can be implemented in different ways and can include different implementations depending on which functional units/circuits or external units/circuits are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

The second storage circuit 546 can store the second software 542. The second storage circuit 546 can also store the information such as data representing incoming images, data representing previously presented image, sound files, or a combination thereof. The second storage circuit 546 can be sized to provide the additional storage capacity to supplement the first storage circuit 514. During the training process the second storage circuit 546 can receive the base station data 535 for two or more of the position satellite 110 in the satellite array 202 of FIG. 2.

For illustrative purposes, the second storage circuit 546 is shown as a single element, although it is understood that the second storage circuit 546 can be a distribution of storage elements. Also, for illustrative purposes, the navigation system 100 is shown with the second storage circuit 546 as a single hierarchy storage system, although it is understood that the navigation system 100 can include the second storage circuit 546 in a different configuration. For example, the second storage circuit 546 can be formed with different storage technologies forming a memory hierarchal system including different levels of caching, main memory, rotating media, or off-line storage.

The second storage circuit 546 can be a controller of a volatile memory, a nonvolatile memory, an internal memory, an external memory, or a combination thereof. For example, the second storage circuit 546 can be a controller of a nonvolatile storage such as non-volatile random-access memory (NVRAM), Flash memory, disk storage, or a volatile storage such as static random access memory (SRAM).

The second storage interface 548 can receive information from the other functional units/circuits or from external sources, or can transmit information to the other functional units/circuits or to external destinations. The external sources and the external destinations refer to sources and destinations external to the second device 106.

The second storage interface 548 can include different implementations depending on which functional units/circuits or external units/circuits are being interfaced with the second storage circuit 546. The second storage interface 548 can be implemented with technologies and techniques similar to the implementation of the second control interface 544.

The second communication circuit 536 can enable external communication to and from the second device 106. For example, the second communication circuit 536 can permit the second device 106 to communicate with the first device 102 over the cloud network 104. By way of an example, the second device 106 can provide the RTK correction 109 to the first device 102 in order to correct the satellite provided reference location 204 of the first device 102 to the real-world location 314 of FIG. 3.

The second communication circuit 536 can also function as a communication hub allowing the second device 106 to function as part of the cloud network 104 and not limited to be an endpoint or terminal unit or circuit to the cloud network 104. The second communication circuit 536 can include active and passive components, such as microelectronics or an antenna, for interaction with the cloud network 104.

The second communication circuit 536 can include a second communication interface 550. The second communication interface 550 can be used for communication between the second communication circuit 536 and other functional units or circuits in the second device 106. The second communication interface 550 can receive information from the other functional units/circuits or can transmit information to the other functional units or circuits.

The second communication interface 550 can include different implementations depending on which functional units or circuits are being interfaced with the second communication circuit 536. The second communication interface 550 can be implemented with technologies and techniques similar to the implementation of the second control interface 544.

The second communication circuit 536 can couple with the cloud network 104 to send information to the first device 102, including the updates for the location correction module 115 in the second device transmission 510. The first device 102 can receive information in the first communication circuit 516 from the second device transmission 510 of the cloud network 104. The navigation system 100 can be executed by the first control circuit 512, the second control circuit 534, or a combination thereof. For illustrative purposes, the second device 106 is shown with the partition containing the second user interface 538, the second storage circuit 546, the second control circuit 534, and the second communication circuit 536, although it is understood that the second device 106 can include a different partition. For example, the second software 542 can be partitioned differently such that some or all of its function can be in the second control circuit 534 and the second communication circuit 536. Also, the second device 106 can include other functional units or circuits not shown in FIG. 5 for clarity.

The functional units or circuits in the first device 102 can work individually and independently of the other functional units or circuits. The first device 102 can work individually and independently from the second device 106 and the cloud network 104.

The functional units or circuits in the second device 106 can work individually and independently of the other functional units or circuits. The second device 106 can work individually and independently from the first device 102 and the cloud network 104.

The functional units or circuits described for the first device 106 and the second device 106 can be implemented in hardware. For example, one or more of the functional units or circuits can be implemented using a gate array, an application specific integrated circuit (ASIC), circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

By way of a further example, the first device 102 can be the autonomous vehicle or the driver assisted vehicle. The first interface circuit 518 can receive input from the base station 110. The actual location 111 can be generated by the first control circuit 512 from the RTK correction 109 generated by the second device 106.

It has been discovered that the second device 106 can receive the base station data 535 in order to calculate the RTK correction 109 for each of the base station 110 and each of the position satellites 110 in the satellite array 202. As an example, the second control circuit 534 can pass the base station data 535 to the location correction module 115 for analysis. The location correction module 115 can generate the RTK correction 109 by calculating the critical parameters that convert the satellite provided reference location 204 to the actual location 111. It is understood that the processes of the conversion of the satellite provided reference location 204 to the actual location 111 is timing critical and the AI correction calculator 116 of FIG. 1 can include hardware and software as necessary to complete the conversion in the shortest time possible.

Figure 6:
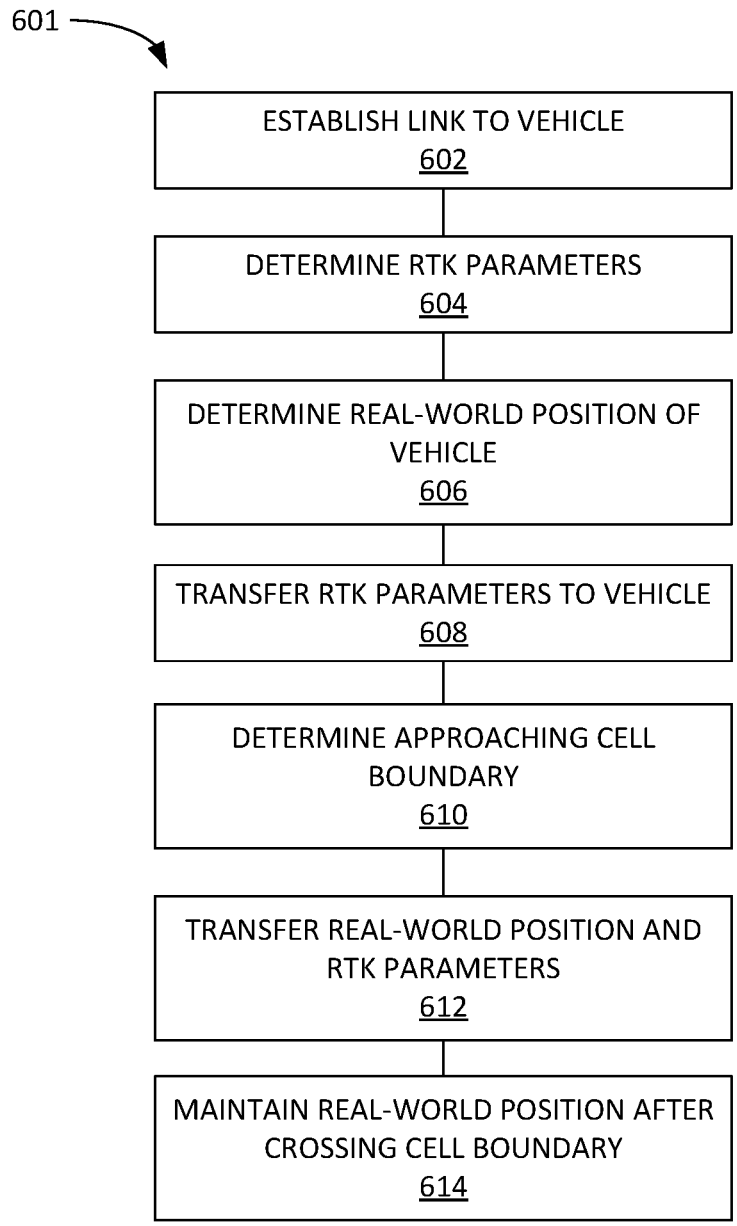
FIG. 6 is an exemplary control flow of the navigation system in an embodiment.

Referring now to FIG. 6, therein is shown a control flow 601 of the navigation system 100 of FIG. 1 in an embodiment of the present invention. The control flow 601 depicts an establish link to vehicle module 602, in which the first base station 214 of FIG. 2 becomes aware of the first device 102 of FIG. 1 through the OTA communication 222 of FIG. 2.

The control flow 601 proceeds to a determine RTK parameters module 604, in which the first base station 214 communicates with the satellite array 202 of FIG. 2 in order to calculate the pseudorange 316 of FIG. 3, the carrier phase 207, the carrier phase ambiguity, the estimated clock error, a list of the satellite array 202 used to locate the first device 102, and the satellite provided reference location 204 of FIG. 2 for the first device within the first RTK cell 224 of FIG. 2. The satellite provided reference location 204 can provide a one to two meters precision, which is insufficient for the first device 102, such as an autonomous vehicle or a driver assisted vehicle.

The control flow 601 proceeds to a determine real-world position vehicle module 606, in which the second device 106 of FIG. 1 can perform the RTK calculations by the AI correction calculator 116 of FIG. 1 to calculate the real-world location 314 of FIG. 3 of the first device 102. The AI correction calculator 116 can refine the real-world location 314 to a one centimeter and three centimeters precision.

The control flow 601 proceeds to a transfer RTK parameters to vehicle module 608, in which the second device 106 can instruct the first base station 214 to transfer the real-world location 314 to the first device 102 by the OTA communication 222. The second device 106 can monitor the OTA communication 222 in order to determine the progress of the first device through the first RTK cell 224.

The control flow then proceeds to a determine approaching a cell boundary module 610, in which the second device 106 can determine that the first device 102 is about to cross a cell boundary 226 of FIG. 2 from the first RTK cell 224 into the Qth RTK cell 228 of FIG. 2. By way of an example, with the first device 102 travelling at 60 miles per hour (MPH), it can only travel 1.056 inches in one millisecond. This provides ample time for the second device to analyze the route of the first device 102 relative to the boundaries of the first RTK cell 224. When the first device 102 has passed the last possible route within the first RTK cell 224, the second device can prepare for the crossing into the Qth RTK cell 228 by compiling the list of the critical parameters used in the first RTK cell 224, including the real-world location 314, pseudoranges 316, carrier phase 207 measurements, a list of the satellite array 202 used to locate the first device 102, and corresponding integer ambiguity that were calculated by the AI correction calculator 116.

The control flow then proceeds to a transfer real-world position and RTK parameters module 612, in which the second device 106 can cause the first base station 214 to transfer the critical parameters from the first base station 224 to the Qth base station 218 through the parameter transfer 227 of FIG. 2. The Qth base station 218 can prepare for the transition of the first device 102 ahead of the actual crossing of the cell boundary 226. This allows a seamless transfer of the real-world position 314 without causing a delay for recalibration of the real-world position 314. When the first device crosses into the Qth RTK cell 228 of FIG. 2, the real-world position 314 of the first device 102 is continuously known.

The control flow then proceeds to a maintain real-world position after crossing cell boundary module 614, wherein the second device 106 can monitor the progress of the first device 102 through the Qth base station 218 and can support modifications of the list of the satellite array 202 used to guide the first device 102, changes in the carrier phase 207, and prepare for crossing the subsequent one of the cell boundary 226.

It is understood that each of the modules listed in the above description can utilize software executed in a specific hardware configuration. By way of an example, the first control circuit 512 can communicate with the second device 106, the first base station 224, the Qth base station 218, the satellite array 202, and combinations thereof through the first communication unit 516. As a further example, the second control circuit 534 can communicate with the first device 102, the first base station 224, the Qth base station 218, the satellite array 202, and combinations thereof through the second communication circuit 536.

It has been discovered that the navigation system 100 can provide continuous monitoring of the real-world position 314 of the first device 102 with one centimeter to three centimeters precision across regions of a route that crosses the cell boundary 226. The capability to transfer ahead the critical parameters required to calculate the real-world position 314 prior to the actual crossing of the cell boundary 226 can enable the first device 102 to maintain autonomous control across the entire region of the route.

Figure 7:
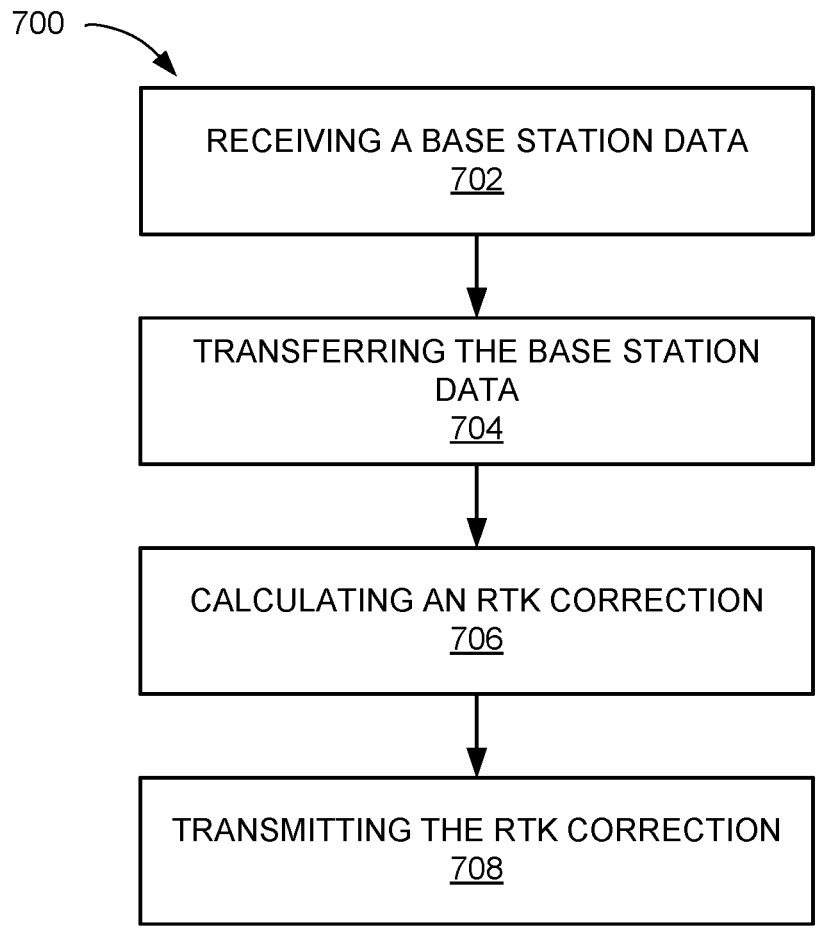
FIG. 7 is shown a flow chart of a method of operation of a navigation system in an embodiment of the present invention.

Referring now to FIG. 7, therein is shown a flow chart of a method 700 of operation of a navigation system 100 of FIG. 1 in an embodiment of the present invention. The method 700 includes: receiving a base station data including an actual location and a satellite provided reference location in block 702; transferring the base station data to an artificial intelligence (AI) correction calculator, already trained to negate a multipath interference of a position satellite in a block 704; calculating a real-time kinematics (RTK) correction, by the AI correction calculator based on the satellite provided reference location and the actual location in a block 706; and enabling the communication circuit to transmit the RTK correction by an over the air (OTA) communication to the base station including the base station transferring the RTK correction to a device for correcting the satellite provided reference location to a real-world location and displaying on the device in a block 708.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
    a communication circuit configured to:
        receive a base station data including an actual location and a satellite provided reference location, and
        transfer the base station data to an artificial intelligence (AI) correction calculator, already trained to negate a multipath interference of a position satellite;
    a control circuit, coupled to the communication circuit, configured to:
        calculate a real-time kinematics (RTK) correction, by the AI correction calculator, based on the satellite provided reference location and the actual location; and
        enable the communication circuit to transmit the RTK correction by an over the air (OTA) communication to the base station including the base station transferring the RTK correction to a device for correcting the satellite provided reference location to a real-world location and displaying on the device.

2. The system as claimed in claim 1 wherein the control circuit is configured to:
    identify a sea of RTK cells including the RTK correction computed for the first RTK cell and the Qth RTK cell; and monitor the device approaching a cell boundary of the first RTK cell for a parameter transfer to the Qth RTK cell.

3. The system as claimed in claim 1 wherein the communication circuit is configured to receive the base station data includes receive a position signal from each of a position satellite in a satellite array.

4. The system as claimed in claim 1 wherein the control circuit is configured to:
monitor the OTA communication between the base station and the device including determining when the device will cross a cell boundary; and
trigger the base station to transfer a pseudorange and a carrier phase to a Qth base station beyond the cell boundary for maintaining the real-world location of the device.

5. The system as claimed in claim 1 wherein the control circuit is configured to initiate a parameter transfer from a first base station to a Qth base station including transferring a pseudorange of the first position satellite, a carrier phase of the first position satellite, a carrier ambiguity calculated by the AI correction calculator, and a list of a satellite array used to locate the device.

6. The system as claimed in claim 1 wherein the control circuit is configured to calculate the RTK correction based on a pseudorange and a carrier phase includes correcting the satellite provided reference location to the real-world location.

7. The system as claimed in claim 1 wherein the control circuit is configured to provide the RTK correction includes enabling the device to correct the satellite provided reference location to the real-world location with a one centimeter to three centimeter precision.

8. The system as claimed in claim 1 the communication circuit is further configured to communicate with a first base station, a Qth base station, and the device includes transmitting the RTK correction through a parameter update prior to the first device crossing a cell boundary.

9. The system as claimed in claim 1 wherein the control circuit is configured to provide a parameter transfer in preparation for the device crossing a cell boundary between a first RTK cell and a Qth RTK cell.

10. The system as claimed in claim 1 wherein the communication circuit is configured to initiate a parameter transfer between a first base station and a Qth base station prior to the device crossing a cell boundary between a first RTK cell and a Qth RTK cell.

11. A method of operation of the navigation system comprises:
receiving a base station data including an actual location and a satellite provided reference location;
transferring the base station data to an artificial intelligence (AI) correction calculator, already trained to negate a multipath interference of a position satellite;
calculating a real-time kinematics (RTK) correction, by the AI correction calculator, based on the satellite provided reference location and the actual location; and
enabling the communication circuit to transmit the RTK correction by an over the air (OTA) communication to the base station including the base station transferring the RTK correction to a device for correcting the satellite provided reference location to a real-world location and displaying on the device.

12. The method as claimed in claim 11 further comprising:
identifying a sea of RTK cells including the RTK correction computed for the first RTK cell and the Qth RTK cell; and
monitoring the device approaching a cell boundary of the first RTK cell for a parameter transfer to the Qth RTK cell.

13. The method as claimed in claim 11 wherein receiving the base station data includes receiving a position signal from each of a position satellite in a satellite array.

14. The method as claimed in claim 11 further comprising:
monitoring the OTA communication between the base station and the device including determining when the device will cross a cell boundary; and
triggering the base station to transfer a pseudorange and a carrier phase to a Qth base station beyond the cell boundary for maintaining the real-world location of the device.

15. The method as claimed in claim 11 further comprising initiating a parameter transfer from a first base station to a Qth base station includes transferring a pseudorange of the first position satellite, a carrier phase of the first position satellite, a carrier ambiguity calculated by the AI correction calculator, and a list of a satellite array used to locate the device.

16. The method as claimed in claim 11 further comprising calculating the RTK correction based on a pseudorange and a carrier phase includes correcting the satellite provided reference location to the real-world location.

17. The method as claimed in claim 11 further comprising providing the RTK correction includes enabling the device to correct the satellite provided reference location to the real-world location with a one centimeter to three centimeter precision.

18. The method as claimed in claim 11 further comprising communicating with a first base station, a Qth base station, and the device includes transmitting the RTK correction through a parameter update prior to the first device crossing a cell boundary.

19. The method as claimed in claim 11 further comprising providing a parameter transfer in preparation for the device crossing a cell boundary between a first RTK cell and a Qth RTK cell.

20. The method as claimed in claim 11 further comprising initiating a parameter transfer between a first base station and a Qth base station prior to the device crossing the cell boundary between a first RTK cell and a Qth RTK cell.

* * * * *